United States Patent [19]

Ito et al.

[11] 4,432,048

[45] Feb. 14, 1984

[54] MULTIPLE DIGITAL CONTROLLER SYSTEM

[75] Inventors: Tetsuo Ito; Setsuo Arita, both of Hitachi, Japan

[73] Assignee: Hitachi, Ltd., Tokyo, Japan

[21] Appl. No.: 272,006

[22] Filed: Jun. 9, 1981

[30] Foreign Application Priority Data

Jun. 9, 1980 [JP] Japan .................................. 55-78219

[51] Int. Cl.³ .......................... G05B 9/03; G05B 23/02; G06F 15/46
[52] U.S. Cl. .................................... 364/187; 364/161; 364/186; 371/9
[58] Field of Search .............................. 364/184–187, 364/161; 371/8, 9, 11, 68; 318/561, 563–566, 609, 610

[56] References Cited

U.S. PATENT DOCUMENTS

| | | | |
|---|---|---|---|
| 3,939,328 | 2/1976 | Davis | 364/187 X |
| 3,940,594 | 2/1976 | Bleak et al. | 364/184 X |
| 4,059,745 | 11/1977 | Gaertner | 364/187 X |
| 4,236,202 | 11/1980 | Giles et al. | 364/161 X |

*Primary Examiner*—Joseph F. Ruggiero
*Attorney, Agent, or Firm*—Antonelli, Terry & Wands

[57] ABSTRACT

In a multiple digital controller system which comprises a main or first digital controller and at least one stand-by or second digital controller and in which the main digital controller normally applies the control signal to an object to be controlled, and the stand-by digital controller applies the control signal to the controlled object when the main digital controller is disabled, an improvement is made so that an undesirable level variation may not substantially occur in the control signal applied to the controlled object during the transient state of switch-over from the main digital controller to the stand-by digital controller. In the improved multiple digital controller system according to the present invention, the integral calculation to be carried out in the stand-by digital controller in a period n (n=2, 3, ...) is executed on the basis of the data representing the result of integral calculation carried out in the preceding period (n−1) in the main digital controller and transmitted from the main digital controller, in order to eliminate the influence of the difference in conversion error occurring in the A/D converters of the digital controllers.

7 Claims, 4 Drawing Figures

MULTIPLE DIGITAL CONTROLLER SYSTEM

This invention relates to a multiple digital controller system comprising a redundunt connection of a plurality of digital controllers each of which performs arithmetic operations including integral calculations for the purpose of digital control of an object to be controlled.

A multiple digital controller arrangement is classified into a spare stand-by system and a complete multiple system. In the former system, one of the digital controllers is placed in operation, while the remaining controllers are held in a stand-by state. In the latter system, all of the digital controllers are simultaneously placed in operation, and the output signal from only one of them is used for the digital control of an object to be controlled. The present invention is specifically concerned with a multiple digital controller system of the latter or complete multiple system in which the digital controllers operate in an asynchronous mode.

In a multiple digital controller system of the complete multiple type, each of the digital controllers is provided with a failure diagnostic unit which generates its output signal when the associated digital controller is disabled, so that the disabled digital controller can be disconnected from the system, and one of the remaining normal digital controllers can be selected to participate in the control operation. An input signal from an object to be controlled is applied to a processor in each of the digital controllers through a signal input circuit in each of the digital controllers. Since each of these signal input circuits includes an A/D converter circuit, the input signal applied to the processor in one of the digital controllers may include an error resulting from the accuracy of A/D conversion by the A/D converter circuit, while the input signal applied to the processor in another digital controller may include a different conversion error. The signals including the different conversion error are then integrated in the respective digital controllers. Therefore, when one of the digital controllers is disabled and one of the normal digital controllers is selected to participate in the control operation in lieu of the disabled one, a level discontinuity tends to appear in the output signal from the system. The presence of such a level discontinuity in the output signal from the system is undesirable in that it tends to impart a shock to the object being controlled.

It is therefore an object of the present invention to provide an improved multiple digital controller system in which such means are provided that, when the control by the disabled digital controller is switched over to the control by the normal digital controller, any substantial level variation may not occur in the system output signal applied to the object being controlled.

Another object of the present invention is to provide an improved multiple digital controller system which is simple in structure and is therefore inexpensive.

According to an aspect of the present invention, a multiple digital controller system includes a main digital controller and at least one stand-by digital controller each including a signal input circuit receiving an input signal applied from an object to be controlled and an integral calculation unit independently integrating the input signal, wherein, when the main digital controller is disabled, the output signal from the stand-by digital controller is applied to the controlled object. In particular, the present invention provides the improvement of an arrangement in the main digital controller for storing the data representing the result of an integral calculation performed periodically and updating the stored data with the data representing the newest result of integral calculation at the end of each period, and means for transmitting the data representing the result of integral calculation performed in $(n-1)$th period and stored in the main digital controller to the stand-by digital controller immediately before the integral calculation in the next nth period is performed.

In the present invention, the main digital controller and the stand-by digital controller may be completely the same in structure, and, in such a case, one of the digital controllers is determined to be the main controller when it is applying its control output signal to the object to be controlled.

The above and other objects, features and advantages of the present invention will become more apparent from the following detailed description taken in conjunction with the accompanying drawings, in which.

For a better understanding of the present invention, the prior art referred to hereinbefore will be described in detail with reference to FIGS. 1 and 2 before describing the perferred embodiments of the present invention in detail.

Figure 1:
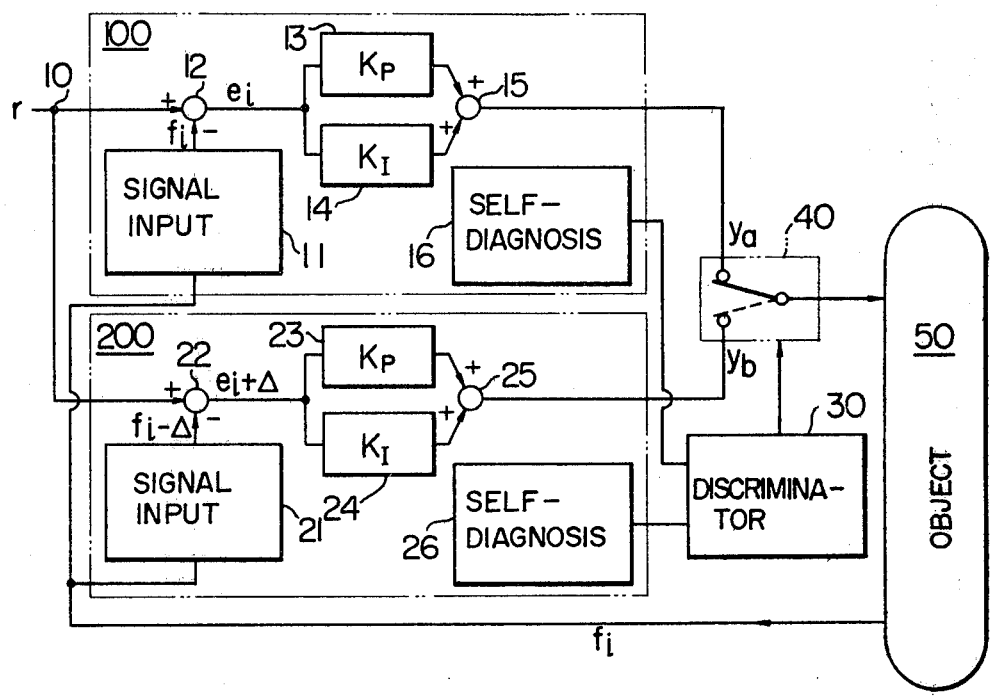
FIG. 1 is a block diagram of a prior art multiple digital controller system including two controllers.

FIG. 1 shows one form of a prior art double digital controller system in which two digital controllers perform arithmetic operations in an asynchronous mode for the purpose of digital control of an object to be controlled.

Referring to FIG. 1, the double digital controller system includes a main or first digital controller 100 and a stand-by or second digital controller 200. In each of the digital controllers 100 and 200 shown in FIG. 1, only basic arithmetic parts are illustrated, and other arithmetic parts are omitted from illustration. The digital controllers 100 and 200 include signal input circuits 11 and 21 respectively, to each of which a detection circuit $f_i$ is applied from an object to be controlled 50 which may be a chemical plant or a power plant. The digital controllers 100 and 200 include adders 12 and 22 respectively each of which generates an error signal $e_i$ indicative of the difference between a reference signal r applied to a reference input terminal 10 and the detection signal $f_i$ supplied from the associated signal input circuit 11, 21. The digital controllers 100 and 200 include proportional calculation units 13 and 23, respectively, having a proportional constant $K_P$, and integral calculation units 14 and 24, respectively, having an integration constant $K_I$. In the embodiment of this invention, the integral calculation units 14 and 24 may be each replaced with a multiplier, as will be described later. The digital controllers 100 and 200 further include adders 15 and 25, respectively.

The error signal $e_i$ is applied to the proportional calculation units 13, 23 and to the integral calculation units 14, 24 at the same time. The output signals from the proportional calculation units 13, 23 and the output signals from the integral calculation units 14, 24 are added in the adders 15, 25 to appear as control output signals $y_a$ and $y_b$, respectively. The main digital controller 100 and the stand-by digital controller 200 include self-diagnosing units 16 and 26, respectively, each of which diagnoses whether or not the associated digital controller is in normal operation, and when such is diagnosed, applies a switch-over command signal through an abnormal signal discrimination circuit 30 to a switch-over circuit 40 which switches over between the control signals $y_a$ and $y_b$. The abnormal signal discrimination circuit 30 discriminates the abnormal digital controller and actuates the switch-over circuit 40 so that the output signal from the normal stand-by digital controller can be applied to the controlled object 50.

Figure 2:
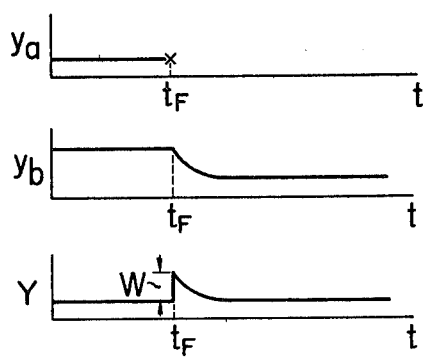
FIG. 2 illustrates how a level variation occurs in the output signal from the prior art multiple digital controller system shown in FIG. 1 during switch-over of the controller output.

FIG. 2 illustrates how a level variation appears in the system output signal during the transient stage of switch-over from the control by the main digital controller 100 to the control by the stand-by digital controller 200. It will be seen in FIG. 2 that switch-over of the output signal $y_a$ from the main digital controller 100 to the output signal $y_b$ from the stand-by digital controller 200 results in appearance of a discontinuous level variation W in the resultant output signal Y applied to the controlled object 50.

Such a discontinuous level variation W is mainly attributable to conversion errors in the signal input circuits 11 and 21 in the digital controllers 100 and 200, respectively. For simplicity of explanation, it is supposed now that the signal input circuit 11 is taken as a reference and that the conversion error in the signal input circuit 21 with respect to the signal input circuit 11 is represented by $\Delta$. Then, the control signals $y_a$ and $y_b$ appearing from the main and stand-by digital controllers 100 and 200 can be expressed by the following equations (1) and (2):

$$y_a = K_p \cdot e_n + K_I \cdot \sum_{i=1}^{n} e_i \cdot \tau \tag{1}$$

$$y_b = K_p \cdot (e_n + \Delta) + K_I \cdot \sum_{i=1}^{n} (e_i + \Delta)\tau \tag{2}$$

where $e_i = r - f_i$, and $\tau$ is the sampling period. Therefore, the variation W occurring during the transient stage of switch-over from the signal $y_a$ to the signal $y_b$ may be approximated by the following equation (3):

$$W = K_p \cdot \Delta + K_I \cdot n \cdot \tau \cdot \Delta \tag{3}$$

$$\approx K_I \cdot n \cdot \tau \cdot \Delta$$

Since each of the signal input circuits 11 and 21 includes generally a circuit for converting an analog signal into a digital signal, a drift which is the defect of an analog circuit tends to occur. Because of the fact that such a drift is generally distributed unequally in polarity, accumulation of the conversion errors $\Delta$ may be attributable to such drifts in the successive periods and may result in a large variation as seen in the equation (3), and such a variation appears in the transient stage of switchover from the signal $y_a$ to the signal $y_b$.

Figure 3:
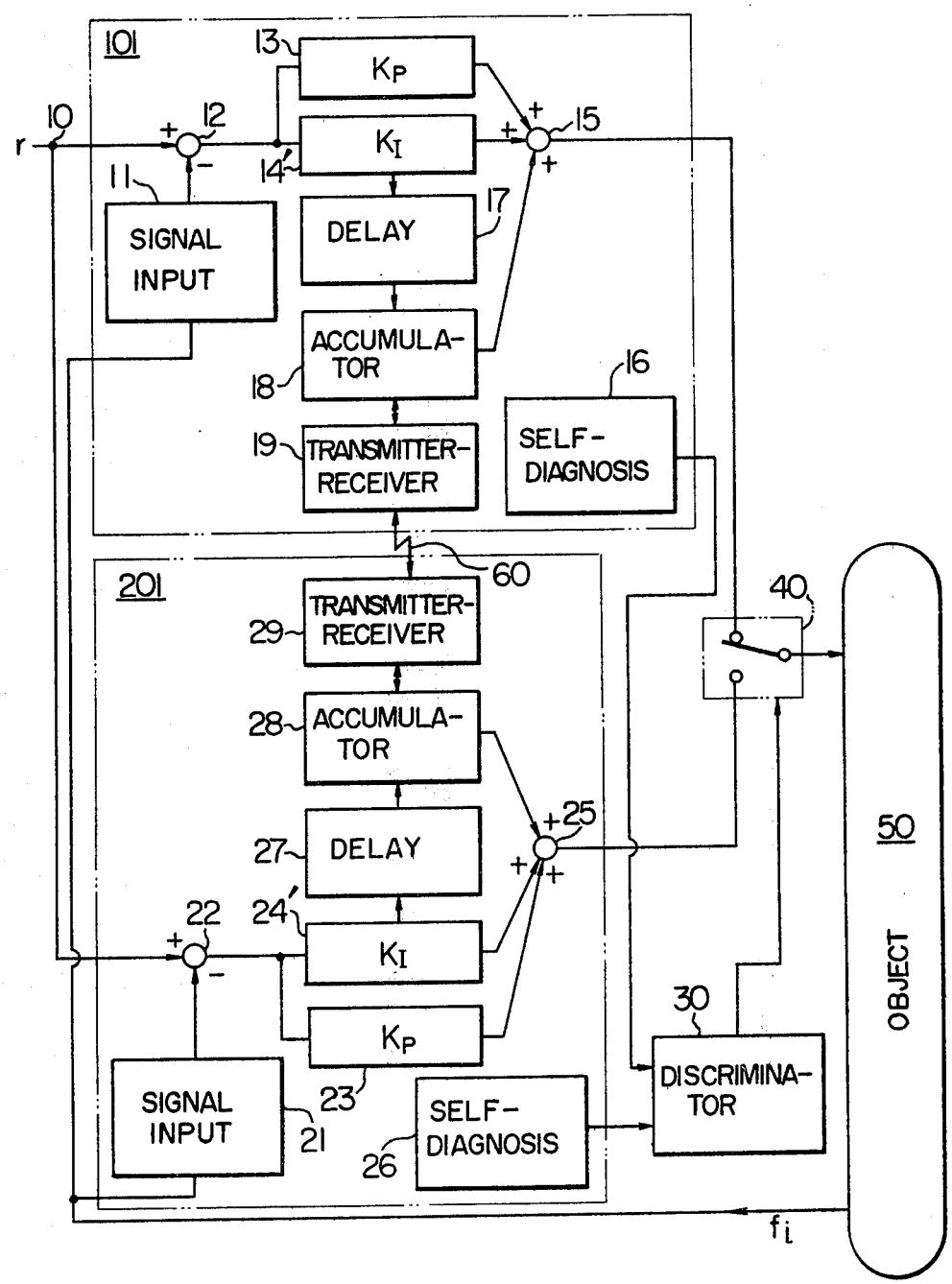
FIG. 3 is a block diagram of a multiple digital controller system including two controllers according to an embodiment of the present invention.

FIG. 3 is a block diagram of a double digital controller system according to an embodiment of the present invention. In FIG. 3, those parts designated by the similar reference numerals are similar to those shown in FIG. 1. Thus, those parts 11, 12, 13, 15, 16, 21, 22, 23, 25, 26, 30, 40 and 50 are similar to those shown in FIG. 1. The double digital system includes a main digital controller 101 and a stand-by digital controller 201 of the similar structure. The main and the stand-by digital controllers 101 and 201 include integral calculation units 14', 24' for integrating the error signal in each period. Such integral calculation units may be multipliers. The controllers 101 and 201 also include data delay elements 17, 27, accumulator units 18, 28, and data transmitting and receiving units 19, 29, respectively, in addition to the parts 12, 22, 13, 23, 15, 25, 16 and 26 described with reference to FIG. 1. The units 19 and 29 are connected by a data transmission line 60.

In each of the main and stand-by digital controllers 101 and 201, proportional and integral calculations are periodically executed by the proportional calculation units 13, 23 and the integral calculation units 14', 24'. In the description given hereinafter, the sequential calculation periods are designated by 1, 2, 3, ..., i, ..., n−1 and n. In the period i, the calculation of $K_I \cdot e_i \cdot \tau$ is executed in the integral calculation unit 14' in the main digital controller 101. At the end of each period, the data calculated in the integral calculation unit 14' is applied to the accumulator unit 18 through the data delay element 17. Therefore, the data $$K_I \cdot \sum_{i=1}^{n-1} e_i \cdot \tau$$

is stored in the accumulator unit 18 before the calculation in the period n starts. The delay time of the data delay element 17 may be selected to be equal to the period of time between the end point of the period (n−1) and the starting point of the period n. At the starting time of the period n, the data stored in the accumulator unit 18 is transmitted from the data transmitting and receiving unit 19 in the main digital controller 101 to the data transmitting and receiving unit 29 in the stand-by digital controller 201 by way of the data transmission line 60. In the adder 15 in the main digital controller 101, the output signals from the proportional calculation unit 13, integral calculation unit 14' and accumulator unit 18 are added together, and the resultant output signal from the adder 15 is applied to the controlled object 50 as the control signal. On the other hand, the stand-by digital controller 201 operates in the period n in a manner as described below. The data $$K_I \cdot \sum_{i=1}^{n-1} e_i \cdot \tau$$

representing the result of integral calculation till the end of the period (n=1) and received by the data transmitting and receiving unit 29 in the stand-by digital controller 201 is applied to the accumulator unit 28 to be stored therein. The proportional calculation unit 23 and integral calculation unit 24' in the stand-by digital controller 201 execute calculations similar to those executed by the corresponding units 13 and 14' in the main digital controller 101. However, the data representing the result of calculation in the integral calculation unit 24' is not stored in the accumulator unit 28 when the controller 201 is operating as a stand-by controller. Instead, the data $$K_I \cdot \sum_{i=1}^{n-1} e_i \cdot \tau$$

representing the result of integral calculation executed in the main digital controller 101 till the end of the period (n−1) is applied and stored in the accumulator unit 28 in the stand-by digital controller 201 in place of the data calculated in the calculation unit 24'. Other operations are the same as those carried out in the main digital controller 101. The data delay element 27 in the stand-by digital controller 201 is necessary when the stand-by digital controller 201 takes the role of the main digital controller.

The control signal $y_a$ appearing in the period n from the main digital controller 101 as a result of the calculations described above is expressed by the following equation (4) which is the same as the equation (1):

$$y_a = K_p \cdot e_n + K_I \cdot e_n \cdot \tau + K_I \cdot \sum_{i=1}^{n-1} e_i \cdot \tau \quad (4)$$

$$= K_p \cdot e_n + K_I \cdot \sum_{i=1}^{n} e_i \cdot \tau$$

On the other hand, the control signal $y_b$ appearing from the stand-by digital controller 201 when switched over is expressed by the following equation (5):

$$y_b = K_p(e_n + \Delta) + K_I(e_n + \Delta)\tau + K_I \cdot \sum_{i=1}^{n-1} e_i \cdot \tau \quad (5)$$

$$= K_p(e_n + \Delta) + K_I \cdot \Delta \cdot \tau + K_I \cdot \sum_{i=1}^{n} e_i \cdot \tau$$

The data $K_I \cdot e_n \cdot \tau$ calculated in the integral calculation unit 14' is delayed by the data delay element 17 and is applied to the accumulator unit 18 after the above calculation. In the accumulator unit 18, the data $K_I \cdot e_n \cdot \tau$ is added to the data $$K_I \cdot \sum_{i=1}^{n-1} e_i \cdot \tau,$$

and the resultant data $$K_I \cdot \sum_{i=1}^{n} e_i \cdot \tau$$

is stored in the accumulator unit 28 to prepare for the calculation in the period (n+1).

Therefore, when the main digital controller 101 is disabled, and the control by the main digital controller 101 is switched over to the control by the stand-by digital controller 201, the level variation W of the system control signal output can be expressed by the following equation (6):

$$W = (K_P + K_I \tau)\Delta \quad (6)$$

This value is very small compared with the prior art one given by the equation (3) and is thus almost negligible.

Figure 4:
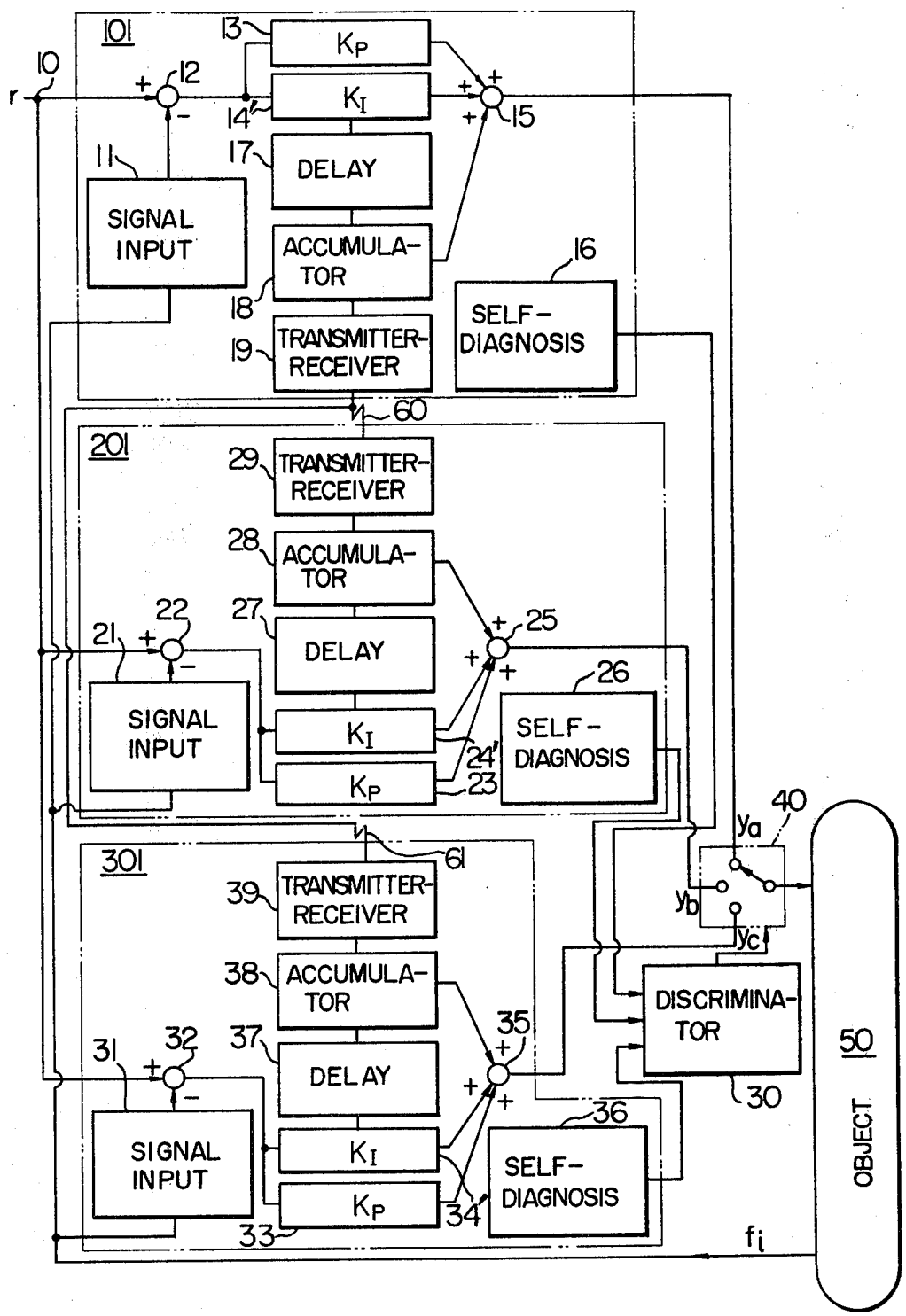
FIG. 4 is a block diagram of a multiple digital controller system including three controllers according to another embodiment of the present invention.

FIG. 4 is a block diagram of a triple digital controller system according to another embodiment of the present invention. In FIG. 4, similar reference numerals are used to designate similar parts appearing in the preceding figures. The triple digital controller system includes two stand-by digital controllers 201 and 301. The operation of the stand-by digital controller 301 is similar to that of the other stand-by digital controller 201. That is, those parts 31, 32, 33, 34', 35, 36, 37, 38 and 39 are and operate similar to those parts 21, 22, 23, 24', 25, 26, 27, 28 and 29. As described hereinbefore with reference to FIG. 3 showing the first embodiment of the present invention, one of the stand-by digital controllers 201 and 301 is selected to operate as the main digital controller when the main digital controller 101 is disabled.

What is claimed is:

1. A multiple digital controller system comprising a main digital controller and at least one stand-by digital controller, each of which controllers includes signal input means; integral calculation means for independently integrating an input signal derived from the signal input means; output means for producing an output object control signal which is capable of controlling an object, said output object control signal including the data representing the result of integral calculation; and self-diagnosis means for diagnosing whether or not the associated controller is in normal operation, the system further comprising switch-over means for selecting one of said output object control signals of said digital controllers for applying to said object in accordance with an output signal of said self-diagnosis means, wherein the improvement comprises the system including means for transmitting the data representing the result of integral calculations executed in said integral calculation means of said main digital controller performing control of said object in a period (n−1) (where n is 2, 3, 4, . . . ) to said stand-by digital controller before the integral calculation in the next period (n) starts, the integral calculation means of said stand-by digital controller executing the integral calculation in the period (n) on the basis of the data calculated in the period (n−1) in the integral calculation means of said main digital controller.

2. A multiple digital controller system according to claim 1, wherein each of said integral calculation means includes means for multiplying an input signal in each period, means for delaying the passage of the multiplied signal by a predetermined period and means for accumulating the multiplied input signal.

3. A multiple digital controller system according to claim 1, wherein the system has a main digital controller and two stand-by digital controllers, and wherein each of said controllers is connected to one another through data transmitting and receiving means included in each of said controllers, respectively.

4. A multiple digital controller system according to claim 1, wherein said signal input means includes an input circuit having an A/D converter, and wherein each controller includes means for adding a reference signal to a signal derived from the signal input circuit.

5. A multiple digital controller system according to claim 1, wherein each of said digital controllers operate in asynchronism with one another.

6. A multiple digital controller system according to claim 3, wherein said signal input means includes an input circuit having an A/D converter, and wherein each controller includes means for adding a reference signal to a signal derived from the signal input circuit.

7. A multiple digital controller system according to claim 3, wherein each of said digital controllers operate in asynchronism with one another.

* * * * *